Figure 1:
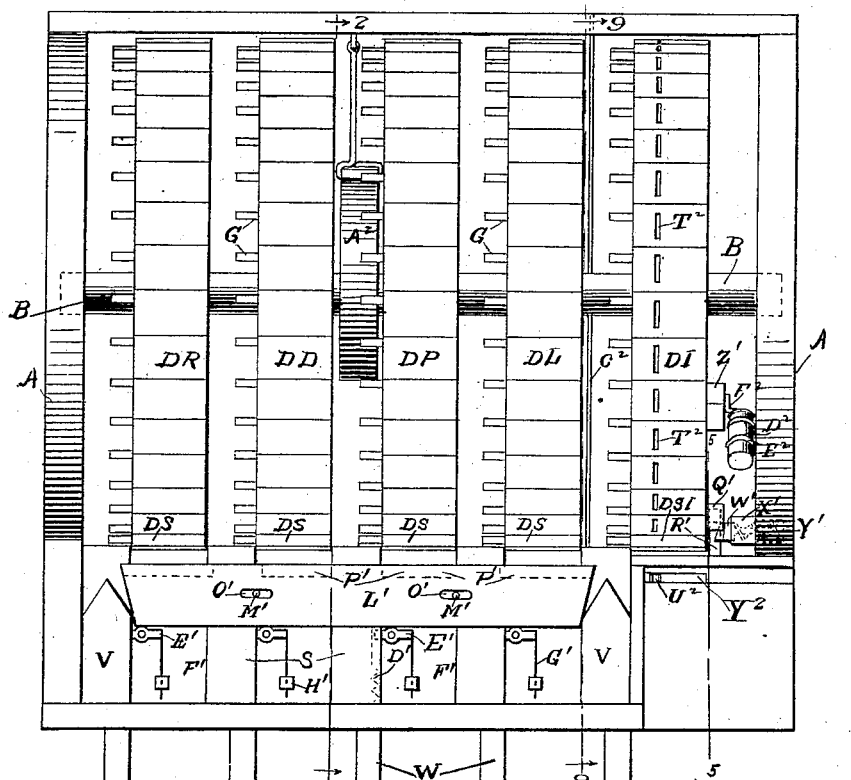

J. H. McELROY.
VOTING MACHINE.
APPLICATION FILED SEPT. 10, 1897.

909,104.

Patented Jan. 5, 1909.
3 SHEETS—SHEET 1.

Witnesses
Inventor
J. H. McElroy

THE NORRIS PETERS CO., WASHINGTON, D. C.

J. H. McELROY.
VOTING MACHINE.
APPLICATION FILED SEPT. 10, 1897.
909,104.
Patented Jan. 5, 1909.
3 SHEETS—SHEET 2.
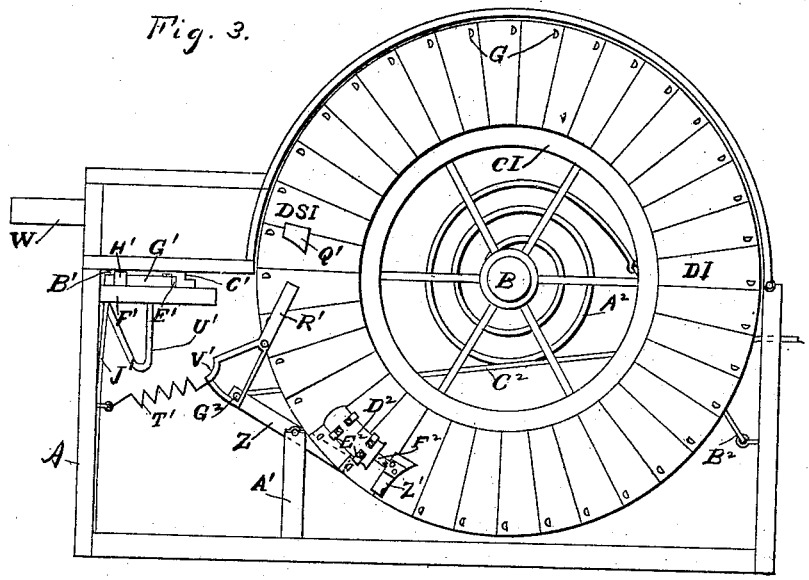
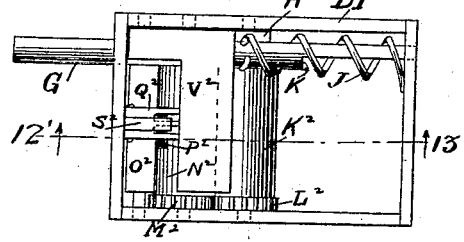
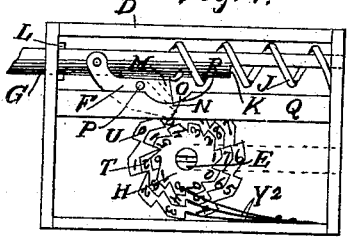
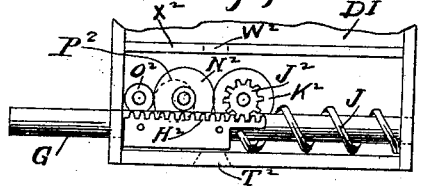
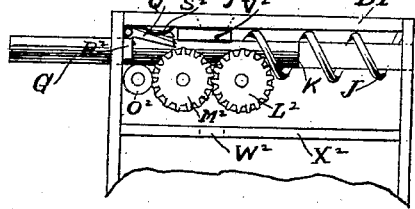
Witnesses
Inventor
J. H. McElroy

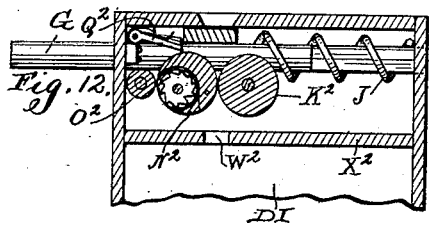
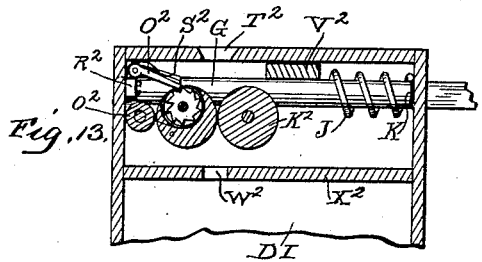
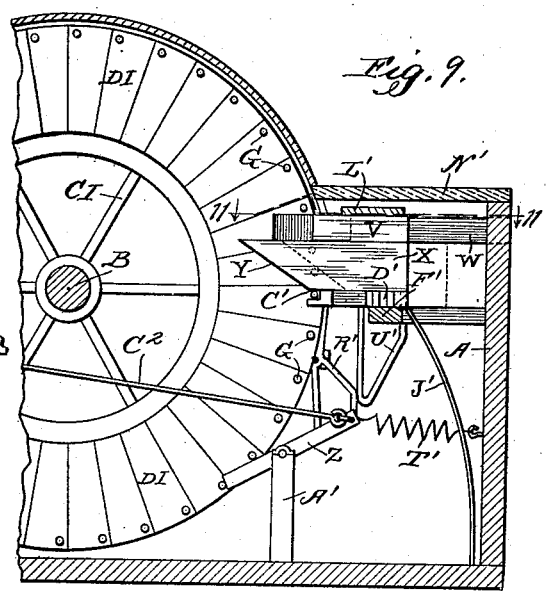
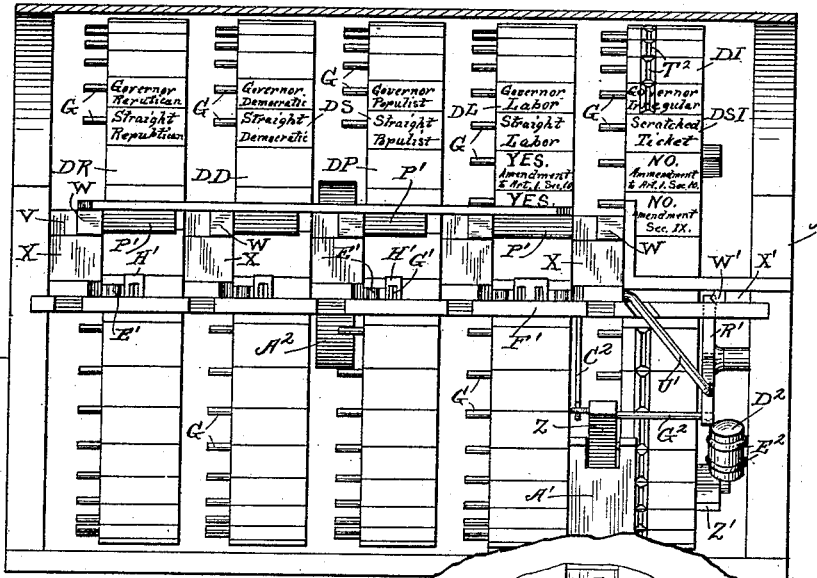
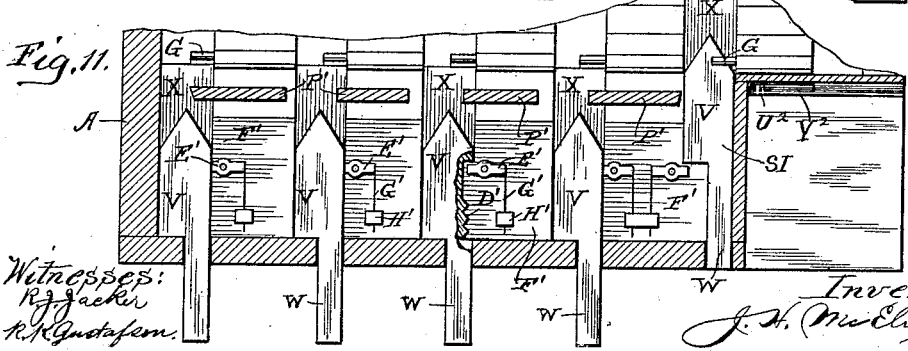

UNITED STATES PATENT OFFICE.

JOHN H. McELROY, OF ROSSVILLE, ILLINOIS.

VOTING-MACHINE.

No. 909,104.      Specification of Letters Patent.      Patented Jan. 5, 1909.

Application filed September 10, 1897. Serial No. 651,182.

*To all whom it may concern:*

Be it known that I, JOHN HOWARD MCELROY, a citizen of the United States, residing at Rossville, in the county of Vermilion and State of Illinois, have invented a new and useful Voting-Machine, of which the following is a specification.

My invention relates to that class of registering mechanisms commonly known as voting machines, adapted for use in general elections, and by which each voter registers in secrecy his choice of the candidates for the various offices presented by the different parties, so that at the close of the polls, the total of all the votes cast for each of the candidates can be read off, and the results of the election immediately ascertained.

It has for its object the simplification of the mechanism employed; the providing of novel means for casting a "straight" or "scratched" ticket as may be desired; the indication of the voter's preference for any persons not regularly nominated by any party; the providing of such locking mechanisms as will absolutely prevent any repeating or inaccurate voting; and various other objects that will be more specifically pointed out in the annexed claims. To attain these objects, I have embodied my invention in certain mechanisms, one form of which is illustrated in the accompanying drawings, in which the same reference characters are used to designate identical parts in all the figures, of which—

Figure 14:
Figure 2:
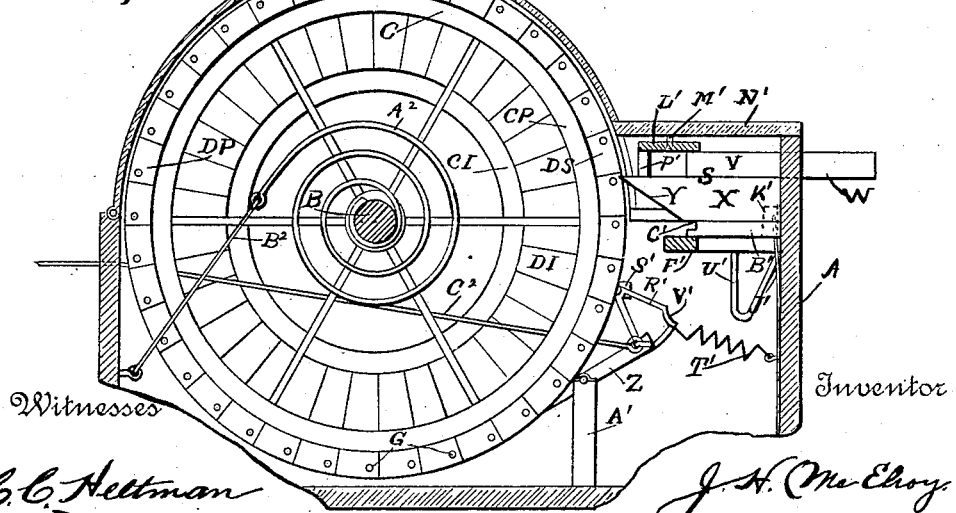

Figure 1 is a plan view of the complete machine with the top of the casing removed; Fig. 2 is a vertical section on the line 2—2 of Fig. 1; Fig. 3 is an elevation of the right hand end of the machine with that end of the casing removed; Fig. 4 is an elevation of one of the registers with the front of its casing removed; Fig. 5 is a fragmentary detail in section on the line 5—5 of Fig. 1; Figs. 6, 7 and 8 are elevations of the front, top and bottom, respectively, of one of the irregular balloting devices, with the necessary portions of the casing removed to show the interior mechanism; Fig. 9 is a view in section on the line 9—9 of Fig. 1, but with the operating piece shown in its operated position; Fig. 10 is a front elevation of the machine with the front of the casing removed; Fig. 11 is a detail in section on the line 11—11 of Fig. 9; Figs. 12 and 13 are detail views in section of the irregular balloting mechanism on the line 12—13 of Fig. 6, but showing the parts in different positions; and Fig. 14 is a perspective view of a latch employed showing the beveled faces thereof.

The apparatus embodied in my invention is located in a casing A, suitably shaped, as seen to snugly inclose the operating mechanism. Journaled in suitable bearings formed in the ends of the casing is the shaft B, which has rigidly connected to it a series of wheels, two of which, CP and CI, are shown in Fig. 2, and whose peripheries serve as supports for the plural series of ballot indicating devices which are preferably registers DR, DD, DP and DL, employed for the candidates of the Republican, Democratic, Populist and Labor parties respectively; and receptacles DI for ballots for irregular candidates. These may be arranged from left to right in the order indicated, one wheel being devoted to each party, and the registers for the candidates for the same office being located in the same horizontal line. Each of these registers (see Fig. 4) consists of a shallow casing in which are mounted upon a stud E a series of register disks U, T and H, separated from each other by washers (not shown) splined upon the stud E to prevent motion being communicated from one disk to another by friction. These disks have the customary ten notches, and the digits from 1 to 9, inclusive, and 0 are inscribed thereon between the notches. These disks vary in size as seen, and have the customary deep notches between the digits 1 and 2, on the units and tens disks, so that when they pass from 9 to 0 at the sight opening (normally covered by a slide the position of which is indicated by the dotted lines in Fig. 4) the actuating dog F will be permitted to engage the next higher wheel and carry it forward one tooth to "carry" the tens, or tens and hundreds, as the case may be.

The dog F is pivoted by a yoke to a sliding rod G, one end of which projects from the end of the casing some distance, and in operation is forced into the casing forcing the opposite end out of the casing on the opposite side an equal distance against the stress of the helically coiled expanding spring J surrounding the rod G, and secured thereto at its left hand end. To prevent the turning of the rod, I conveniently cut away one half of its right hand end for the distance that its left hand end projects from the casing, and shape its aperture in the casing accordingly, and the shoulder K formed by its cut away portion serves as a stop to prevent its over-operation, while a pin L, which passes through the rod prevents the spring J from displacing it at the other end. The dog F has formed upon its rear face two triangular lugs M and N (shown in dotted lines) in the planes of the disks U and T respectively, which together with the point O of the dog F in the plane of the disk H, coöperate with the deep notches in the disks U, T and H, to count up the reciprocations of the rod G, as is common in the deep notch carrying registers. The dog F is supported out of operative position at rest and during the major portion of its stroke by the pin P projecting therefrom and resting upon the bar Q fastened to the ends of the casing. The depression R in the bar permits the dog F to descend by gravity, which may be aided by a spring if desired, into engaging position during a sufficient portion of the stroke of the rod G to advance the register one notch. A series of three strong leaf springs $Y^2$ resting between the teeth of the disks U, T and H, serve to prevent any backward movement and over-rotation thereof. To operate the chosen one of these sliding rods G and at the same time advance the series of wheels so as to bring forward another row of registers to the operating position, I provide a series of push pieces S, shown in Figs. 1 and 2, corresponding in number to the wheels, and each of which consists of a portion W projecting outside of the casing, and an enlarged inner portion, which for convenience of description I will describe as constructed of three horizontal layers secured together. The upper layer consists of the projecting portion W and the interior wider portion V which terminates in a wedge, the right hand face of which serves to force into the casing whatever rod G may come into its path when the push piece is shoved inwardly. The middle portion X is thicker than the others, and its inner end terminates in an inclined cam surface Y, which when the push piece S is shoved inwardly, takes over the exposed portion of the rod G which may be in its path, and forces the rod and its register downwards a distance equal to the width of the register. Thus the entire support with all the registers is advanced one space and is held advanced by the broad detent Z pivoted in a post A' and counterweighted so as to hold its inner end resting against the projecting portion of the rod G of some one of the receptacles DI, as shown in Fig. 9, which rods are thus made to serve the purpose ordinarily filled by ratchet teeth. The lowest portion B' of the push piece S terminates at its inner end in a recess C', which at the end of the complete inward movement of the push piece coöperates with the rod G just forced down, and serves to lock it while the push piece S is held inward, and also prevents any overthrow. Although the vertical distance between the upper surface of the portion X of the push piece S and the recess C' is greater than the distance between the adjacent surfaces of the adjacent rods G, the push piece cannot jam between the rods because the rod G above the one that is carried down by the cam surface Y is forced inward into the casing out of the way by the right hand side of the wedge V before it reaches the top of the portion X.

In order to compel a complete stroke of the push pieces S in both directions, I place upon the right hand side of each of the portions B' of the four left hand push pieces and upon the left hand side of the same portion of the right hand push piece a series of teeth D', shown in Figs. 9 and 11, which coöperate with a dog E' pivoted to the plate F' which extends the length of the machine, and being fastened in the ends thereof also serves to aid in supporting the push pieces S. The dog E' has fastened thereto a leaf spring G' held in position by a recessed lug H' through which it passes on the plate F'. The dog E' and the teeth D' coöperate together in the well known manner to compel a complete stroke of the push piece in both directions. A leaf spring J' fastened at its lower end to the front of the casing and its upper end loosely fitting in a cavity K' (indicated by dotted lines in Fig. 2) in the push piece S and permitted to move forward with the push piece by slots in the plate F' serves to return the pieces S when they are released. It will be seen that the rod G of the register just above the one engaged by the incline Y will be brought down into position so as to be forced into its casing and thereby actuated by the right hand face of the wedge of the portion V during the completion of its inward movement.

To prevent the simultaneous operation of two of the push pieces and the consequent voting of two candidates for the same office, I provide a bar L' which rests upon the upper faces of the portions V of the push pieces S, and is held in position and allowed a limited longitudinal movement by the pins M' fastened in the upper portion N' of the casing and extending into the slots O' formed in said bar. This bar L' has a series of downwardly projecting flanges P', which are separated from each other by spaces just the width of the pieces V which enter their corresponding spaces when operated. It will be seen from Fig. 11 that the flanges between which these spaces are left are not so wide as the distance between the pieces V, so that when any of the pieces V are pushed in (the ones at the ends taking against the ends of their respective flanges) all the other spaces being out of register with their pieces V, the operation of another one, or of two simultaneously is prevented. The portion N' of the casing is made of glass, and it will be seen from Figs. 2 and 9 that owing to the bar L', and the opaque curved portion of the casing, only the line of registers in position to be operated next by the operation of the push pieces can be seen. Each of these registers has painted or otherwise marked upon its face the name of the office to which it is devoted, the candidate therefor and the name of his party, so as to inform the voter for whom he is voting when he operates the push piece to the right of any registers.

The registers DS, of which there is one on each wheel, all arranged in the same horizontal row, are devoted to the straight party ballots which may be cast, and when any push piece is operated to cast a straight party ballot it is obvious that some means must be provided for preventing the subsequent operation of any of the candidate ballots. For this purpose, I arrange mechanism so that the machine is locked immediately upon the operation of a straight party ballot from any further movement, and any further balloting by the voter is thereby prevented. To accomplish this, I secure rigidly on the right hand side of one of the irregular balloting devices DI mounted upon the wheel CI a lug Q' having the form and location best seen in Figs. 3 and 5. This lug Q' projects into the path of a stop lever R' which is pivotally mounted upon a stud S' fastened to the right hand end of the casing, as shown in Figs. 2 and 5, and which normally rests in the position shown, being held therein by the helically coiled retractile spring T' fastened to its lower end and to the front of the casing. When the machine is ready for balloting and any one of the four left hand push pieces is operated to vote a straight party ticket, the forward movement of the support resulting therefrom brings the lug Q' against the upper end of the lever R' and thus prevents any further operation of the push pieces as they cannot advance the support any farther and they cannot be pushed in without advancing the support on account of the rods G being in the path of the push pieces. If, however, the voter desires to cast a scratched ticket, he first operates the push piece to the right, which operates the register DSI, which is of the customary construction, and thus registers the number of scratched votes cast. This operation moves the support forward and the lug Q' would engage the stop lever R' as in the operation of voting a straight ticket, but for the rocking of the end of the lever R' out of the path of the lug Q' by means of the finger U' which is fastened to the right hand push piece S and consequently moves therewith. This finger U', as best shown in Figs. 9 and 10, I conveniently construct of a rod bent into the form of an angular frame and having both ends of the rod secured to the lower side of the portion B' of the push piece in any convenient manner, its forward motion being permitted by a slot in the supporting plate F', in which the finger U' moves as the push piece S is operated.

In order to bring the contacting lower end of the finger U' into the plane of the stop lever R', I incline it to the right, as shown in Fig. 10, and thus upon operation of the right hand push piece S, the lower end of the finger U' contacts with the curved bearing portion V' of the stop lever R' toward the end of its stroke, and thus rocks its upper end out of the path of the lug Q'. To retain the lever R' in this position when the push piece is returned, as shown in dotted lines in Fig. 5, I employ a spring latch W' slidingly mounted in a housing X' fastened to the right hand end of the casing, and normally pressed outward by the helically coiled spring Y', shown in dotted lines in Fig. 1. The face of this latch is inclined outwardly from rear to front, so as to be cammed backward by the movement of the lever R' and to spring forward and detain it as soon as it is passed. Upon the second operation of any one of the push pieces the further forward movement of the support will cause the lug Q' to take against the beveled upper surface of the latch and press it back sufficiently to release the lever R'. The same action will take place if the lug Q' should pass it moving in the other direction, as it will in resetting the machine after registering a mixed ballot in which an irregular ballot has been cast by the mechanism to be described, as the face of the latch is beveled in both directions from its horizontal center as well as from front to rear, as shown in Fig. 14.

In order to prevent any attempt to beat the machine by running it completely around after exhausting the list of offices in casting the scratched ticket, I provide another lug Z' similar to the lug Q', and similarly located, but broad enough to contact with the lever R' in whichever position it may be, when the last office to be filled has been voted for. Thus it will be seen that when a voter has exhausted his franchise by voting either a straight or scratched ticket, the machine is locked to prevent any further operation until it is reset. This resetting is accomplished by a strong spiral spring $A^2$ fastened at one end to the shaft B, preferably between the second and third wheels from the left hand end, and at the other end to a rod $B^2$, which in turn is fastened to the rear end of the casing. It will be seen that the advancement of the support by the operation of the push pieces S puts this spring $A^2$ under increased tension, and when the detent Z is withdrawn by pulling the cord or wire $C^2$ connected thereto, the support is immediately returned. To break the force of the shock when the support is returned, I employ a pneumatic dash pot $D^2$, which is curved in the arc of a circle whose center is the shaft B, and fastened to the right hand end of the casing by the bands $E^2$. A piston, not shown, is fastened upon the piston rod $F^2$, similarly curved, and conveniently fastened upon the lug $Z'$, coöperates therewith in the customary manner. The cord or wire $C^2$ which passes through the rear of the casing is inaccessible to the voter, and may be operated by the judges of the election or by the voter automatically as he leaves or enters a door of the booth within which the machine is inclosed. As such connections are common in the art, and form no part of my invention, it is not deemed necessary to illustrate them. A pin $G^2$ extending from the right hand side of the upper end of the detent Z into an opening in the lower portion of the lever $R'$ serves to limit the inward swing of the upper end of the lever $R'$. This opening is of such size and shape that the shifting of the lever $R'$ under the movement of the finger $U'$ will not release the detent Z, and the movement of the detent Z in resetting will not move the lever $R'$ sufficiently to be caught by the latch $W'$.

If the voter desires to vote for a certain candidate for a certain office not regularly nominated by any of the parties, he may do so by voting a scratched ticket by means of the irregular balloting devices on the right hand wheel. These balloting devices $D^1$ are each inclosed in a casing considerably deeper than those used for the regular registers, and are consequently mounted on a wheel of smaller diameter than the other wheels in order to make their surfaces flush with those of the registers. These irregular balloting devices, as shown in Figs. 6, 7, 8, 12 and 13, have the customary sliding rod G which has fastened to its upper side the rack $H^2$, which engages with a pinion $J^2$ rigidly fastened to the upper portion of the feed roller $K^2$, and thus each operation of the rod G reciprocates the roller $K^2$ almost a complete revolution. Rigidly fastened to the lower portion of the shaft on this roller is another pinion $L^2$ which meshes with a similar pinion $M^2$ similarly fastened upon the axis of a coöperating feed roller $N^2$. This latter roller may have upon its surface suitable type which are inked by the roller $O^2$, and serve to print or emboss upon a ballot for an individual some legend such as the name of the office, and in order to further identify the ballot cast and to prevent any possibility of repeating or inserting more than one ballot at a time, I insert in the roller $N^2$ an automatic numbering head $P^2$, the position of which at rest is shown in Fig. 12. This numbering head consists of a series of small type wheels with numbers from 1 to 9 and 0 on their peripheries, and the ten-toothed ratchets rigid therewith, with the customary deep notches in the units and tens wheels, such for instance as are shown in the patent to Cline and Trimble, No. 473,913, dated May 3, 1892. These wheels are advanced a numeral at each operation by the pawl $Q^2$ having as many rigid prongs thereon as there are numbering head wheels, which is hinged on a support $R^2$ fastened to the left hand end of the irregular balloting device casing, and which is pressed against the roller $N^2$ by the curved leaf spring $S^2$ fastened between such support and the casing and interposed between the front of the casing and the pawl $Q^2$. The prongs of this pawl are in slightly different planes, as seen in Figs. 12 and 13, and just at the completion of the inward stroke of the rod G, the units numbering wheel is brought into contact with its pawl sufficiently to advance it a notch, as seen in Fig. 13. The deep notches in the ratchets permit the other prongs to engage their ratchets when it is necessary to carry tens and hundreds.

The operation of this complete device for irregular balloting is as follows: Upon operating the push piece $S^1$, the receptacle $D^1$ which is brought down so that the vertical opening $T^2$ in its face coincides with the vertical elongated opening $U^2$ in the glass plate $Y^2$ which forms a portion of the casing at this place, as seen in Figs. 1 and 10, so that the name of the office thereon will be visible. As the rod G is forced in, the shield $V^2$, which may be a continuation of the rack $H^2$, being conveniently made of a single piece of metal suitably bent over, is carried away from behind the opening $T^2$ to admit of a ballot having the name of the irregular candidate written thereon being inserted, and at the same time the rollers $K^2$ and $N^2$ feeding outwardly are rotated until the numbering head is brought into position to be actuated by the pawl $Q^2$. The voter having written the name of the irregular candidate on the ballot and folded it as instructed until its length is less than the circumference of the rollers $K^2$ and $N^2$ inserts the end of it between the rollers through the apertures $U^2$ and $T^2$. The rollers are suitably roughened to grip it, and when the push piece S is released and returns, the rod G returning to normal position under the stress of the spring J, feeds by the rack $H^2$ and the pinions operating the rollers $K^2$ and $N^2$ the ballot inwardly through the opening $W^2$ in the inner partition $X^2$ into the receptacle for the ballots, and at the same time numbers it, and imprints the name of the office for which it is cast. The journals of the rollers $K^2$, $N^2$ and $O^2$ are mounted in the top and bottom of the register casing.

If there are any constitutional amendments, or other questions requiring an affirmative or negative vote, to be submitted to the people, I devote to this purpose as many rows before the straight ticket row as there are questions to be submitted, and place the yea and nay registers on the two right hand wheels, as clearly shown in Fig. 1

10. I omit the corresponding registers and sliding rods G on the other wheels, so that the voter must cast his ballot for or against the question or questions in order to get at the office registers, as the wheels cannot be advanced to bring the straight-ticket and candidate rows to voting position except by the engagement of the two right-hand push pieces S with the sliding rods G of the amendment registers.

While I have shown the two rows of registers arranged so that a register in one row must be operated before a register in another row can be operated as employed for the purpose of compelling a vote on questions, it will be apparent that this construction and mode of operation might be employed for other purposes.

While I have shown my novel straight ticket and irregular balloting devices as applied to one specific form of a machine, it will be understood that they might be applied to widely different forms.

While I have shown my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States is—

1. In a voting machine, the combination of a movable support, the series of ballot indicating devices thereon for "straight ticket" and "candidates", with means for actuating any one of said ballot indicating devices when it is in a certain position and simultaneously moving said support to bring another ballot indicating device to said position, and mechanism for locking said support from further movement upon the operation of the "straight ticket" ballot indicating device in said series and for preventing the actuation of a "candidate" ballot indicating device by the voter prior or subsequently to his operation of said "straight ticket" ballot indicating device.

2. In a voting machine, the combination of the movable support, the series of ballot indicating devices thereon and the operating pieces thereof, with the movable pieces coöperating with said operating pieces to advance said support and operate one of said ballot indicating devices, and a detent coöperating with said operating pieces, substantially as described.

3. In a voting machine, the combination of the movable support, the series of ballot indicating devices for "straight ticket" and "candidates" thereon, with means for actuating any one of said ballot indicating devices when it is in a given position and simultaneously moving said support to bring another ballot indicating device into said position, and mechanism for locking said support from further movement upon the actuation of the first or last ballot indicating device of said series and for preventing the actuation of a "candidate" ballot indicating device by the voter prior or subsequently to his operation of said "straight ticket" ballot indicating device, substantially as described.

4. In a voting machine, the combination of the movable support, the series of ballot indicating devices thereon for "straight ticket" and "candidates", with means for actuating any one of said ballot indicating devices when it is at a certain position and simultaneously moving said support to bring another ballot indicating device to said position, and mechanism for locking said support from further movement upon the actuation of the "straight ticket" or last ballot indicating device of said series and for preventing the prior or subsequent operation by the voter of a "candidate" ballot indicating device.

5. In a voting machine, the combination of the movable support, the series of ballot indicating devices thereon for "straight ticket" and "candidates", with means for actuating any one of said ballot indicating devices when it is at a certain position, means for advancing said support, and mechanism for locking said support from further movement upon the actuation of the "straight ticket" ballot indicating device and for preventing the actuation of a "candidate" ballot indicating device by the voter prior or subsequently to his actuation of the "straight ticket" ballot indicating device.

6. In a voting machine, the combination of the movable support, the series of ballot indicating devices thereon for "straight ticket" and "candidates", with means for actuating any one of said ballot indicating devices when it is at a given position, means for advancing said support, and mechanism for locking said support from further movement upon the actuation of the first ballot indicating device of said series and for preventing the actuation of a "candidate" ballot indicating device by the voter prior or subsequently to his actuation of the "straight ticket" ballot indicating device.

7. In a voting machine, the combination of the movable support, the series of ballot indicating devices thereon for "straight ticket" and "candidates", means for actuating anyone of said ballot indicating devices when at a given position and simultaneously moving said support to bring another ballot indicating device to said position, with mechanism for locking said support from further movement upon the actuation of the "straight ticket" ballot indicating device of said series and for preventing the actuation of any of said "candidate" ballot indicating devices by the voter prior or subsequently to his actuation of said "straight ticket" ballot indicating device, and independent means for moving said support without actuating any of said ballot indicating devices.

8. In a voting machine, the combination of the movable support, the series of ballot indicating devices thereon for "straight ticket" and "candidates", with means for actuating any of said ballot indicating devices when it is in a given position and simultaneously moving said support to bring another ballot indicating device into said position, mechanism for locking said support from further movement upon the actuation of the "straight ticket" ballot indicating device of said series and for preventing the actuation of a "candidate" ballot indicating device by the voter prior or subsequently to his actuation of the "straight ticket" ballot indicating device, and means for releasing said locking mechanism, substantially as described.

9. In a voting machine, the combination of the movable support, the series of ballot indicating devices thereon for "straight ticket" and "candidates", with means for actuating any one of said ballot indicating devices when it is in a given position, means for advancing said support, a motor energized by said advancement, a catch to prevent backward movement of said support, mechanism for locking said support from further movement upon the actuation of the "straight ticket" ballot indicating mechanism and for preventing the actuation of any of said "candidate" ballot indicating devices by the voter prior or subsequently to his actuation of the "straight ticket" ballot indicating device, and means for releasing said locking mechanism and catch.

10. In a voting machine, the combination of the movable support, the series of ballot indicating devices thereon, with the movable pieces for operating the ballot indicating devices, a detent coöperating with said pieces, and means for withdrawing said detent.

11. In a voting machine, the combination of the movable support, the series of ballot indicating devices thereon, with the movable pieces for operating said ballot indicating devices, means for advancing said support, a motor energized by the advance of said support, and a detent coöperating with said pieces, and means for withdrawing said detent, substantially as described.

12. In a voting machine, the combination of the movable support, the series of ballot indicating devices thereon, the movable pieces for operating the ballot indicating devices, with means for advancing said support, a stop to prevent further movement of said support when it is in one of two positions chosen at will, and a detent for coöperating with said pieces, substantially as described.

13. In a voting machine, the combination of the movable support, the plural series of ballot indicating devices thereon, a lock capable of acting to prevent a further movement of said support when it reaches a certain position, and means for advancing said support and permitting said lock to act or not, as may be desired.

14. In a voting machine, the combination of the movable support, a lock capable of acting to prevent further movement of said support when it reaches a certain position, with a reciprocating piece for advancing said support and permitting said lock to act, and another reciprocating piece for advancing said support without permitting said lock to act.

15. In a voting machine, the combination of the movable support, the series of ballot indicating devices thereon, the movable pieces for operating the ballot indicating devices, with means for advancing said support, a motor energized by the advance of said support, a stop to prevent the further movement of said support when in one of two positions chosen at will, a detent coöperating with said pieces, and means for releasing said detent.

16. In a voting machine, the combination of a series of ballot indicating devices comprising "straight ticket" and "candidate" indicating devices, with actuating mechanism coöperating with any of said ballot indicating devices, said ballot indicating devices and actuating mechanism being movable relative to each other to determine which ballot indicating device shall be operated, and means to prevent any further movement of the machine when a "straight ticket" ballot indicating device has been operated and for preventing the prior, simultaneous or subsequent operation of any of said "candidate" ballot indicating devices when a "straight ticket" ballot indicating device has been operated.

17. In a voting machine, the combination of the rotary support, the series of ballot indicating devices thereon, with means for actuating anyone of said ballot indicating devices when it is at a given position and simultaneously moving said support to bring another register into position, a detent to prevent backward movement thereof, automatic means to return said support to initial position when released from said detent, a piston on said support, a dash pot coöperating therewith whose longitudinal axis is the arc of a circle with the axis of said support for a center, substantially as described.

18. In a voting machine, the combination of a series of ballot indicating devices comprising "straight ticket" and "candidate" indicating devices, with actuating mechanism coöperating with any of said ballot indicating devices, said ballot indicating devices being movable relative to said actuating mechanism to determine which ballot indicating device shall be operated, and means to prevent any further movement of said ballot indicating devices when a "straight ticket" ballot indicating device has been operated and for preventing the prior, simultaneous or subsequent operation of any of said "candidate" ballot indicating devices by the voter when a "straight ticket" ballot indicating device has been operated, substantially as described.

19. In a voting machine, the combination of the movable support, plural series of ballot indicating devices thereon, each series containing all the candidates of a party for the offices to be filled, a series of irregular balloting devices, one for each office, also mounted upon said support, with means for moving said support to bring all the party ballot indicating devices and the irregular balloting device for any particular office to a particular position, and operating mechanism at said position by which the chosen ballot indicating device or the irregular balloting device may be actuated, substantially as described.

20. In a voting machine, the combination of the movable support, plural series of ballot indicating devices thereon, each series containing all the candidates of a party for the offices to be filled, a series of irregular balloting devices, one for each office, also mounted upon said support, with means for moving said support to bring all the party ballot indicating devices and the irregular balloting device for a particular office to a certain position, and operating devices for actuating one of said ballot indicating devices or the irregular balloting device when at said position.

21. In a voting machine, the combination of the movable support, plural series of ballot indicating devices thereon, each series containing all the candidates of a party for the offices to be filled, a series of irregular balloting devices, one for each office, the ballot indicating devices and irregular balloting device for a particular office being arranged in one line, with means for moving said support, and operating devices whereby one, and only one, of the ballot indicating devices or the irregular balloting device in a line can be operated when at a given position.

22. In a voting machine, the combination of the movable support, the series of ballot indicating devices and irregular balloting devices arranged thereon in rows representing all the candidates for a particular office, and in cross rows representing all the candidates of a party, with means for simultaneously moving said support and operating one of the ballot indicating devices or the irregular balloting device in one of the office rows.

23. In a voting machine, the combination of the movable support, the series of ballot indicating devices and irregular balloting devices arranged thereon in rows representing all the candidates for a particular office, and in cross rows representing all the candidates of a party, with a reciprocating piece for each party series to simultaneously move said support and operate one of the ballot indicating devices or the irregular balloting device in its series, a complete stroke mechanism for each of said pieces, and means for preventing the simultaneous operation of any of said pieces, substantially as described.

24. In a voting machine, the combination of the movable support, the series of ballot indicating devices and irregular balloting devices thereon arranged in rows, representing all the candidates for a particular office, one row representing straight tickets, and in cross rows representing all the candidates of a particular party, with means for simultaneously moving said support and operating one of the ballot indicating devices or irregular balloting devices in one of the office rows, and a lock preventing further movement of said support when a straight ticket ballot indicating device is operated, substantially as described.

25. In a voting machine, the combination of the movable support carrying a plural series of ballot indicating devices, one series for each party, and a series of irregular balloting devices, arranged in rows devoted to the straight tickets and the various offices, with means for advancing said support to bring any row of the ballot indicating devices and the irregular balloting device to the operating point, and a stop to prevent further movement of said support when any one of the ballot indicating devices of the straight tickets is operated, substantially as described.

26. In a voting machine, the combination of the movable support carrying a plural series of ballot indicating devices, one series for each party, and a series of irregular balloting devices, arranged in rows devoted to the straight tickets and the various offices, with means for advancing said support to bring any row of ballot indicating devices and the irregular balloting device to the operating point, and a stop to prevent further movement of said support when any one of the ballot indicating devices of the straight ticket row or the last row is operated.

27. In a voting machine, the combination of the movable support carrying a plural series of ballot indicating devices, one series for each party, and a series of irregular balloting devices, said ballot indicating devices and irregular balloting devices arranged in rows devoted to the straight tickets and the candidates for the various offices, and a series of reciprocating pieces, one for each party and one for the irregular balloting devices for operating the ballot indicating devices and irregular balloting devices and advancing said support, and a stop permitted to operate by the ballot indicating device operating pieces but not by the irregular balloting piece, to prevent further movement of said support upon actuation of a straight ticket ballot indicating device.

28. In a voting machine, the combination of the movable support, the ballot indicating devices thereon, and the operating pieces thereof, with the movable piece coöperating with said operating pieces to advance the support.

29. In a voting machine, the combination of the movable support, the ballot indicating devices thereon, and the operating pieces thereof, with the movable piece coöperating with said operating pieces to advance the support and operate one of said ballot indicating devices.

30. In a voting machine, the combination of the movable support, the ballot indicating devices thereon, and the operating pieces therefor, with the movable pieces coöperating with said operating pieces to advance the support, and a detent coöperating with said operating pieces, substantially as described.

31. In a voting machine, the combination of the movable support, the ballot indicating devices thereon, and the reciprocating operating rods thereof, with the push pieces having the cam surfaces thereon coöperating with said rods to advance the support and actuate one of the ballot indicating devices.

32. In a voting machine, the combination of the movable support, a lug thereon, with a stop in the path of said lug, and two or more devices for advancing said support, and connections whereby the operation of one of said devices permits the passage of the stop by the lug.

33. In a voting machine, the combination of the movable support, a lug thereon, with a stop in the path of said lug, and two or more devices for advancing said support, with connections whereby the operation of one of said devices moves said stop to permit the passage of said stop by the lug.

34. In a voting machine, the combination of the movable support, two lugs thereon, with a stop in the path of said lugs, and two or more devices for advancing said support, with connections whereby the operation of one of said devices permits the passage of the stop by one of the lugs, but not by the other one, substantially as described.

35. In a voting machine, the combination of the movable support, the lug thereon, with the stop normally held in the path of said lug, means for advancing said support and moving said stop, and a catch for holding it in the abnormal position.

36. In a voting machine, the combination of the movable support, two lugs thereon, with the stop normally held in the path of said lugs, means for advancing said support and moving said stop sufficiently to permit the passage of one of said lugs, and a catch for holding it in its abnormal position.

37. In a voting machine, the combination of the movable support, the ballot indicating devices thereon, and the operating pieces thereof, with means coöperating with said pieces to advance the support, and means also coöperating with said pieces to actuate the ballot indicating devices, substantially as described.

38. In a voting machine, the combination of the movable support having the series of ballot indicating devices thereon, with means for advancing said support, movable pieces for actuating said ballot indicating devices, and a bar to prevent the operation of more than one of said pieces at any one position of said support.

39. In a voting machine, the combination of a series of ballot indicating devices comprising "straight ticket" and "candidate" indicating devices, with actuating mechanism coöperating with any of said ballot indicating devices, said ballot indicating devices and actuating mechanism being movable relative to each other to determine which ballot indicating device shall be operated, and means to prevent the simultaneous or separate operation of said "straight ticket" and "candidate" ballot indicating devices by the same voter.

40. In a voting machine, the combination of the movable support, the lug Q' thereon, with the reciprocating push piece S to advance said support, the finger U' on said push piece, the locking lever R', and the spring plunger W' having its face beveled as described.

41. In a voting machine, the combination of the movable support, the ballot indicating devices thereon, with the push pieces S to operate said ballot indicating devices, having the wedge shaped portion, and the reciprocating bar L' having the flanges P' thereon.

42. In a voting machine, the combination of the movable support, the ballot indicating devices thereon, the sliding rods G in said ballot indicating devices, with the push pieces S having the cam surface Y and the notch C', substantially as described.

43. In a voting machine, the combination of the casing, with the sliding rod G having a circular cross section and the cutaway portion forming a shoulder K, the casing having apertures forming bearings for said rod of corresponding shape, the spring J, and the lug L, substantially as described.

44. In a voting machine, the combination of the pivoted lever R', the spring T', with the detent Z, and the spring plunger W', substantially as described.

45. In a voting machine, the combination with plural series of ballot indicating devices grouped according to parties, of mechanism arranged according to parties and adapted to actuate said ballot indicating devices to vote a straight ticket, if operated, a supplemental mechanism which when operated prior to the operation of said first mentioned mechanism prevents the straight ticket voting and permits the subsequent operation of said operating mechanism to vote a scratched ticket.

46. In a voting machine, the combination with plural series of ballot indicating devices grouped according to parties, of a series of keys divided according to parties and adapted to actuate said ballot indicating devices to vote a straight ticket, if operated, a supplemental key which when operated prior to the operation of said first named keys prevents the straight ticket voting and permits the subsequent operation of said first mentioned keys to vote a scratched ticket.

47. In a voting machine, the combination with plural series of ballot indicating devices grouped according to parties, of operating mechanism therefor similarly arranged according to parties and adapted to actuate said ballot indicating devices to vote a straight ticket, if operated, locking mechanism brought into operation on the actuation of said operating mechanism to prevent any further operation of the machine, and supplemental mechanism which when operated prior to the operation of said operating mechanism prevents the straight ticket voting and permits the subsequent operation of said operating mechanism to vote a scratched ticket.

48. In a voting machine, the combination with plural series of ballot indicating devices grouped according to parties, of a series of operating keys arranged according to parties and adapted to actuate said ballot indicating devices to vote a straight ticket, if operated, locking mechanism brought into action by the movement of said keys to vote a straight ticket and acting to prevent any further operation of the machine, and a supplemental key which when operated prior to the operation of said operating keys prevents the actuation of said locking mechanism, and permits the subsequent operation of said registers by the keys for voting a scratched ticket.

49. In a voting machine, the combination with a support carrying a series of ballot indicating devices, of an actuating mechanism for said ballot indicating devices for casting a straight ticket at one operation and voting a scratched ticket by plurality of operations, means for causing the relative movement of said support and said actuating mechanism so that the voter's choice of candidates for the different offices may be indicated, and mechanism for locking the machine from further operation when a straight ticket ballot is cast by a single operation of said mechanism, or a scratched ticket by a plurality of operations.

50. In a voting machine, the combination with a support carrying a series of indicating devices, of operating keys for said ballot indicating devices for casting a straight ballot at one operation, or voting a scratched ticket by a plurality of operations, means for causing a relative movement of said support and said actuating mechanism, so that the voter's choice of candidates for the different offices may be indicated, and mechanism for locking the machine from further operation when a straight ticket ballot is cast by the single operation of said keys, or when the scratched ticket is completed by a plurality of operations.

51. In a voting machine, the combination with a support carrying a series of ballot indicating devices, of an actuating mechanism for said ballot indicating devices for casting a straight ticket at one operation or for voting a scratched ticket by a plurality of operations, means for causing a relative movement of said support and said actuating mechanism so that the voter's choice of candidates for the different offices may be indicated, and mechanism for preventing any further relative movement between said support and actuating mechanism when a straight ballot is cast by a single operation of said mechanism, or when a scratched ticket is completed by a plurality of operations.

52. In a voting machine, the combination with a support carrying a series of ballot indicating devices, of a series of keys coöperating with said ballot indicating devices for casting a straight ticket ballot at one operation thereof or a scratched ticket ballot by a plurality of operations, means for causing a relative movement of said support and said actuating mechanism so that the voter's choice of candidates for the different offices may be indicated, and mechanism for locking said support and said keys from further relative movement when a straight ticket ballot is cast by a single operation of said keys or a scratched ticket is completed by a plurality of operations.

53. In a voting machine, the combination of the support, a series of ballot indicating devices thereon, with the pieces for operating the ballot indicating devices, a detent coöperating with said pieces, the detent and support being movable relative to each other so that said detent may coöperate with the different pieces, and means for withdrawing said detent.

54. In a voting machine, the combination with plural series of registers, of operating mechanism for said registers whereby a fixed number of registers in each series can be operated, and connections between two of said series whereby one of the registers in one of said series must be operated in order to permit the operation of any of the registers of the other series.

55. In a voting machine, the combination with a rotary drum or support, of a series of registers and register actuators carried thereby and appropriated individually to various candidates represented on the ballot, and a straight vote recording mechanism comprising a register, a register actuator, and a lock for locking said drum or carrier against rotation, which lock is actuated by or with the actuator for the straight vote recorder, substantially as described.

56. In a voting machine, the combination of the plural series of registers arranged in party columns and office rows, of means for operating a fixed number of registers in each row, and mechanism connecting two of the rows whereby one of the registers in one set of rows must be operated in order to permit the operation of a register in the other set of rows.

57. In a voting machine, the combination with plural party series of ballot-indicating devices, each series comprising a straight ticket and candidate devices, with actuating members, one for each series of the ballot-indicating devices, each series of devices and its coöperating member being movable relative to each other whereby the single actuating member is available for any of the devices, and mechanism interposed between said devices and members whereby the operation of any of the straight ticket devices locks all the other devices in the machine from operation.

58. In a voting machine, the combination with a plural series of registers arranged in groups, of the movable element associated with each register that controls its operation, and mechanism connecting two of the groups whereby one of the elements in one group must be operated in order to permit of the operation of another element in another group.

59. In a voting machine, the combination of the candidate registers, with a pair of yea and nay registers, and connections whereby one of the pair of registers must be operated before a candidate register can be operated.

60. In a voting machine, the combination of the movable support, the series of candidate registers thereon, a pair of registers thereon, with means for operating said registers when at a certain position and simultaneously moving said support, the registers being so located that one of said pair of registers must be operated before a candidate register can be operated.

61. In a voting machine, the combination with the candidate registers grouped according to parties and offices, of a series of mechanisms by a single operation of one of which a straight ballot may be indicated for all the candidates of any party, and connections between said registers and mechanisms whereby one of the latter must be operated before a split ticket can be voted.

J. H. McELROY.

Witnesses:
CHAS. F. CONSAUL,
C. C. HEETMAN.